DE WITT M. COINER.
SHOVEL.
APPLICATION FILED MAY 8, 1918.
1,273,581.
Patented July 23, 1918.
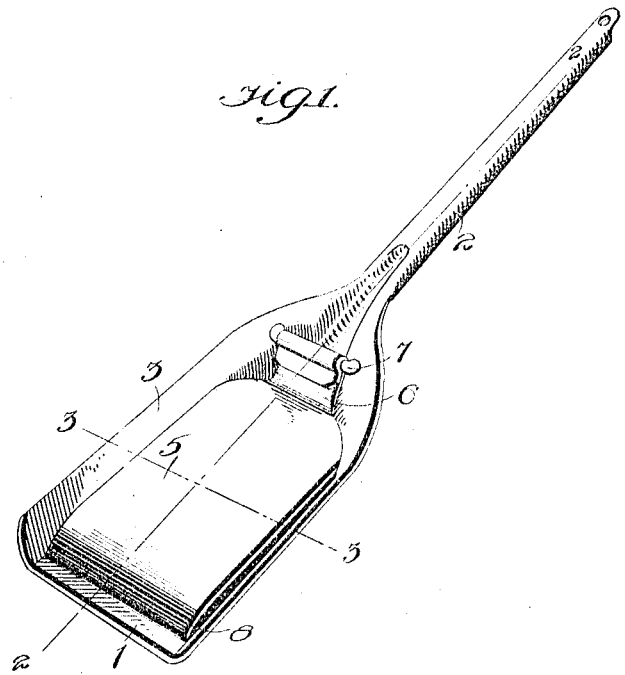
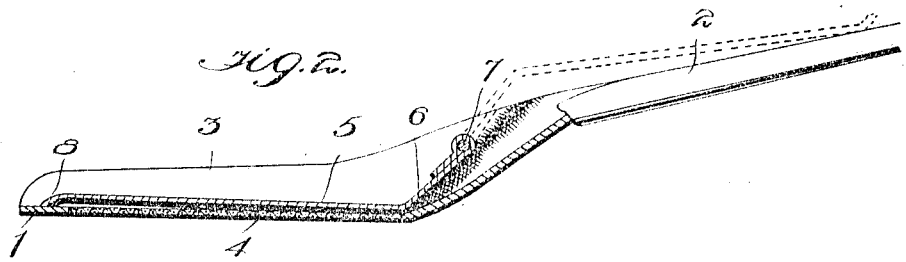
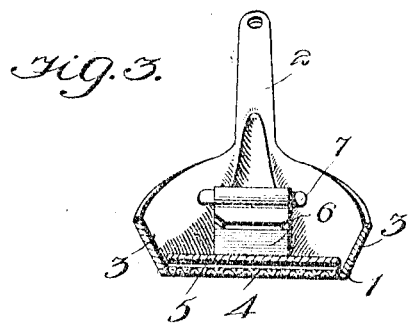
WITNESS
George G. Myers.
INVENTOR
DEWITT M. COINER,
BY
ATTORNEYS

UNITED STATES PATENT OFFICE.

DE WITT MORRISON COINER, OF STATESVILLE, NORTH CAROLINA.

SHOVEL.

1,273,581.

Specification of Letters Patent.  Patented July 23, 1918.

Application filed May 8, 1918.  Serial No. 233,333.

*To all whom it may concern:*

Be it known that I, DE WITT M. COINER, a citizen of the United States, and a resident of Statesville, in the county of Iredell and State of North Carolina, have invented certain new and useful Improvements in Shovels, of which the following is a specification.

My invention is an improvement in shovels, and has for its object to provide a shovel which may be used as a sifter for sifting ashes and the like, or as a shovel for shoveling any desired material.

In the drawings:

Figure 1 is a perspective view of the improved shovel;

Figs. 2 and 3 are sections on the line 2—2 and 3—3, respectively, of Fig. 1.

In the present embodiment of the invention, the shovel comprises a pan or scoop 1 and a handle 2, said handle and scoop or pan being integral. The pan or scoop has the usual side flanges 3, and a portion of the bottom of the scoop is cut away and is replaced by a screen 4. In the present instance the screen is of wire, but it is obvious that it may consist of any other desired material, or might be merely openings in the scoop bottom.

A false bottom 5 is provided for covering the screen when the shovel is in use as a shovel, and this false bottom has a shank 6 at its inner end, which is hinged to a rod 7 arranged transversely of the scoop near its junction with the handle, the said rod being connected to the side flanges 3 of the scoop portion of the shovel.

The hinge for the false bottom is formed by bending the material of the shank about the rod. At the end remote from the shank the false bottom has a portion 8 bent downward at an obtuse angle with respect to the body in such manner that the end of the false bottom will touch the upper face of the scoop bottom beyond the screen. This prevents an abrupt ledge or shoulder at this point.

In use as a shovel, the parts are arranged as shown in Figs. 1 and 3, the false bottom covering the screen. When it is desired to use the shovel as a sifter the false bottom is flipped up into the position of Fig. 2. While the improvement is shown in connection with a fire shovel, it is obvious that it might be applied with equal facility to scoops and shovels of all characters.

I claim:

A shovel comprising a scoop portion and a handle, the scoop portion having a screen bottom, and a false bottom for covering the screen bottom, said false bottom comprising a plate fitting within the scoop over the screen and having an angular shank at the inner end thereof, said shank extending at an obtuse angle with respect to the plate and being pivoted to the shovel at the junction of the scoop and handle well above the level of the screen.

DE WITT MORRISON COINER.

Witnesses:
 J. E. ROBINSON
 C. J. JONES.